June 24, 1930.   J. SACHS   1,767,260
PROTECTED ELECTRIC METER SERVICE APPURTENANCE
Filed Aug. 2, 1922   3 Sheets-Sheet 1
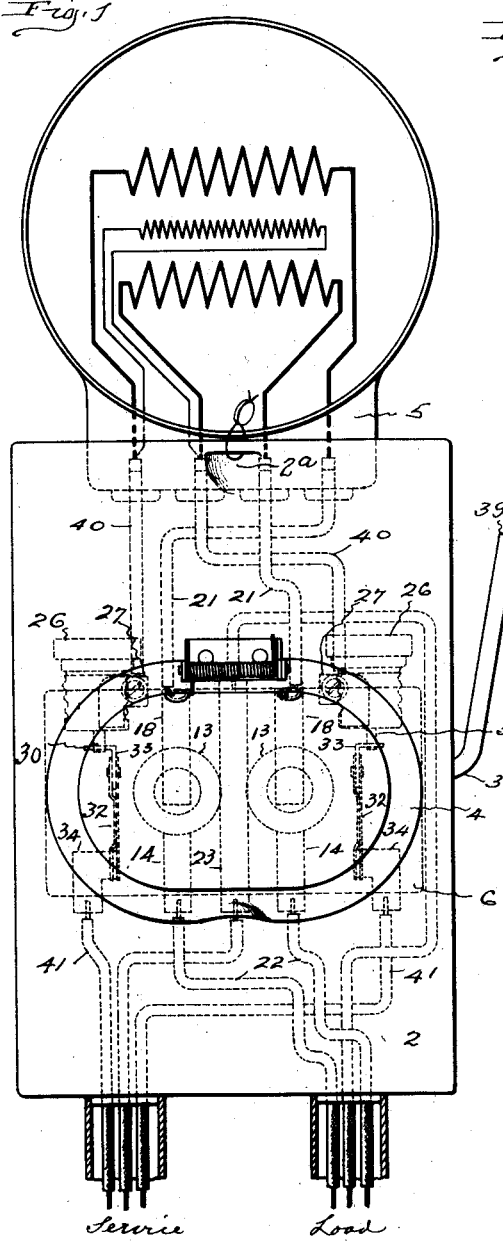

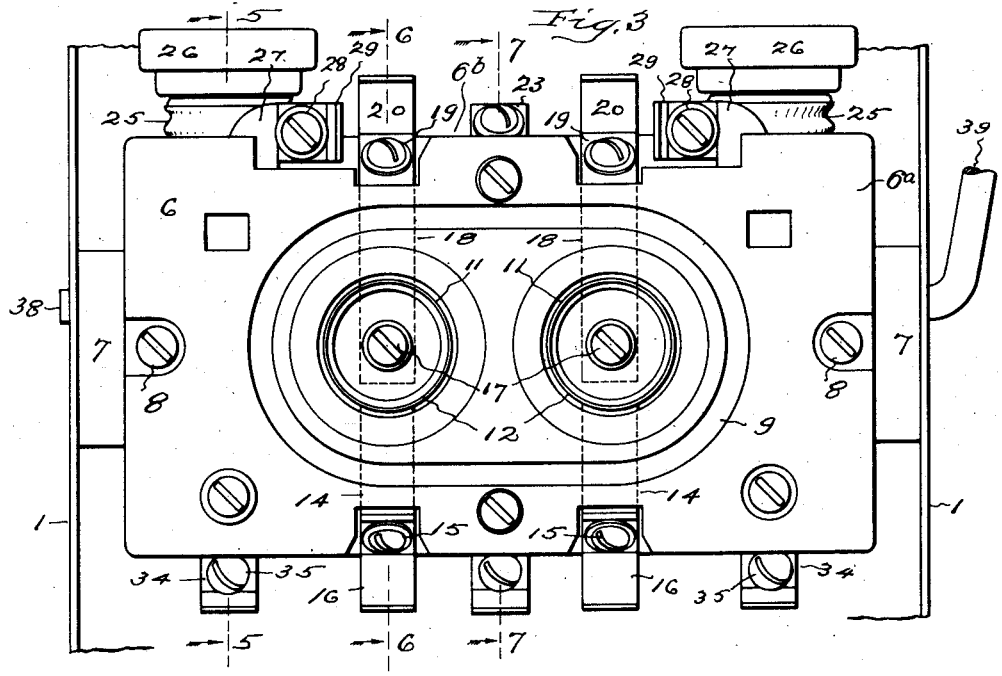

June 24, 1930. J. SACHS 1,767,260
PROTECTED ELECTRIC METER SERVICE APPURTENANCE
Filed Aug. 2, 1922 3 Sheets-Sheet 3
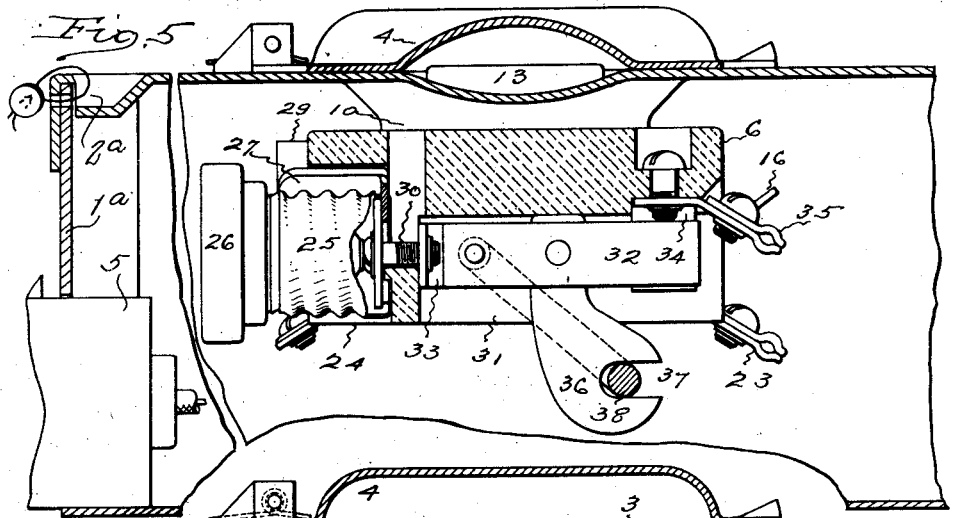
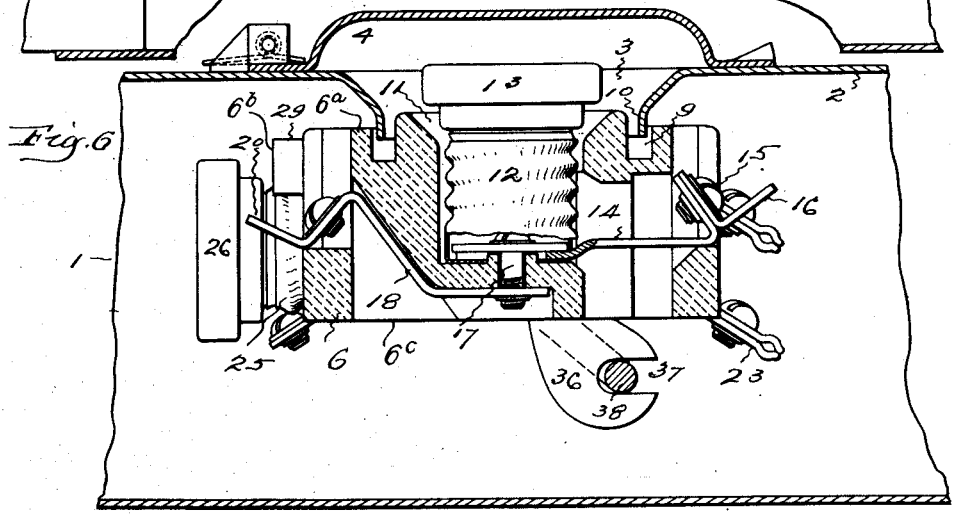
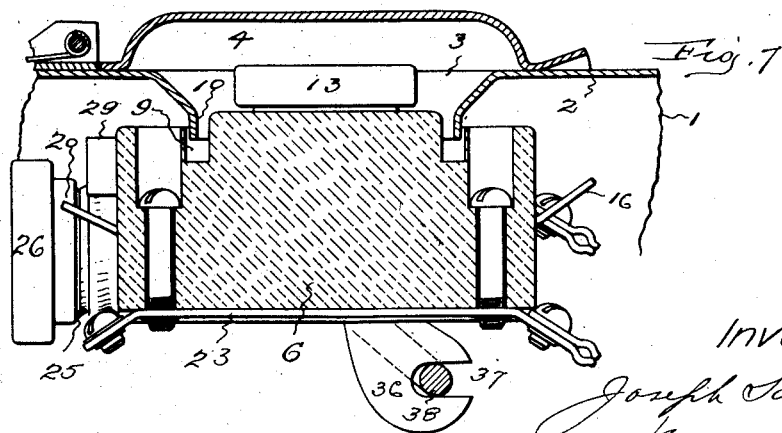
Inventor
Joseph Sachs, by
Harry R. Williams
atty.

Patented June 24, 1930

1,767,260

UNITED STATES PATENT OFFICE

JOSEPH SACHS, OF WEST HARTFORD, CONNECTICUT

PROTECTED ELECTRIC-METER-SERVICE APPURTENANCE

Application filed August 2, 1922. Serial No. 579,178.

This invention relates particularly to those electrical appurtenances which are designed to be installed adjacent to meters and that have circuit controlling means, such as switches, fuses and meter testing links enclosed within protecting boxes which when installed are so closed and sealed that while the circuit controlling means on the load side of the meter are accessible, the circuit controlling means on the service side of the meter are inaccessible and cannot be reached by unauthorized persons and live parts on the service side tapped or manipulated for the purpose of stealing current.

One object of the present invention is to provide a unitary structure combining all of the features and advantages of a complete meter protecting and circuit controlling appliance of this nature, which is cheaper to manufacture and assemble, which is more compact, and which enables the boxes to be made smaller and still have ample room for making the necessary connections, than the prior organizations adapted to accomplish the same result.

This object is attained by arranging in a box adapted to be associated with a meter so as to protect the connections, a single base having on the service side of the meter connections circuit controlling means, which may be a switch, a fuse, a testing link or a combination of such elements, and on the load side of the meter connections circuit controlling means, which may be a fuse, a switch, a testing link or a combination of such elements, the elements being applied to the base in such positions and relations that when the base is located in the box the load side circuit controlling means are accessible at any time by anyone, but the service side controlling means are only accessible when the box is unsealed and the cover is opened by an authorized person.

A further object of the invention is to provide a novel and improved fuse or fuse and switch block which may be independently useful or which may be combined with other parts to form a protected fuse and switch device.

Still further objects of the invention are to provide certain improved details of construction as will be fully apparent from the following specification and claims.

In the accompanying drawings Figure 1 shows a front view of a box containing the invention, with a diagrammatic representation of a meter and the circuit connections. Fig. 2 is a similar view with the lid on the box cover, over fuses on the load side, opened. Fig. 3 is a view on larger scale of the front face of the block that is located in the box. Fig. 4 is a view of the back face of the block. Fig. 5 is a section on the plane indicated by the dotted line 5—5 on Fig. 3. Fig. 6 is a section on the plane indicated by the dotted line 6—6 on Fig. 3. Fig. 7 is a section on the plane indicated by the dotted line 7—7 on Fig. 3.

A device embodying the invention comprises an insulating base on which are mounted various electrical parts as will be described in detail. In the complete embodiment of the invention there is provided a box which encloses the major portion of the base and most of the said electrical parts and which is also preferably provided with means for the protective association with an electric meter.

The box 1, which may be stamped to shape from sheet metal, is provided with a front cover 2 which is arranged to be opened, preferably being hinged to the bottom wall of the box. As clearly shown in Fig. 5, the cover is provided with means at $2^a$ whereby it may be sealed in closed relation with the end wall $1^a$ of the box and thus held in closed position. One wall of the box is provided with an opening 3 for a purpose to be described and preferably this opening is in the cover 2, being shown near the middle thereof. The box preferably includes means independent of the front cover for the protective relationship with the box of a meter located mainly outside thereof. As shown, the said end wall $1^a$ of the box constitutes such means and this end wall is provided with an opening adapted to receive and closely fit in a meter terminal chamber 5. It will thus be seen that when the cover is sealed in closed position the said cover and the said end wall cooperate to completely protect the terminal portion of the meter and all other conducting parts within the casing. Suitable provision is made for the connection of service wires and load wires with the electrical parts within the box and as shown openings for these wires are provided in the bottom end wall. I have shown a three wire system, but it will be understood that the invention is equally applicable to a two wire system.

The base 6 is a single untiary piece of insulation. It is adapted to be mounted in fixed relation to a support, which support is ordinarily a box such as already described. The base preferably has a plurality of faces, such as 6$^a$, 6$^b$, and 6$^c$, adapted for mounting electrical parts and respectively facing in different directions. It will be observed that the face 6$^a$ faces outward away from the support. The face 6$^b$ is preferably substantially perpendicular to the face 6$^a$, and the face 6$^c$ is opposite the face 6$^a$. Preferably as shown in Figs. 3 and 4, the base 6 is mounted on brackets 7 fastened to the sides of the box and held by screws 8 that pass through the ends of the base into the brackets. As shown in Figs. 5 and 6 the brackets support the base with a space between it and the back of the box, and to also support it in direct cooperative relationship with the wall of the box having the opening 3 therein so that the block in and of itself serves to close the said opening. As shown and as already stated the opening 3 is preferably in the cover, and in this case the base cooperates with the cover when the latter is in closed position. Preferably the front face 6$^a$ of the base has a projecting portion 6$^d$ which extends into and effectively closes the opening 3. Preferably and as shown the opening 3 instead of being in the main flat part of the cover is formed by a rearward projecting rim 10 of the cover. The base 6 is preferably provided with an endless groove 9 into which the rim 10 extends when the cover is in closed position. This construction makes it impossible for anyone to pass a wire or other conductor through the opening 3 in the cover into contact with any of the live parts on the service side of the meter connections.

I do not claim as a part of the present invention the rearward projecting rim or hopper 10 on the cover and I do not claim the cooperative relationship between the said rim or hopper and the insulating base and other parts, as these features and combinations form the subject matter of my copending application for fused switch structure, Serial No. 288,952 filed June 28, 1928 as a division of this present application.

On the face of the base which is adjacent the wall containing the opening 3, there is mounted at least one pair of fuse contacts 11 positioned to be accessible through the said opening. These contacts are connectible on the load side of the meter, that is, between the meter and the load wires. When the opening 3 is in the front cover as shown the said contacts are located on the front face 6$^a$ of the base within the projection 6$^d$ thereon. I have shown in the drawings, two pairs of load side fuse contacts which are so arranged that they may be included respectively in two legs of a load circuit. It will be understood however, that I do not limit myself to the exact number of pairs of contacts shown or to any one arrangement of electrical connections for such contacts.

I do not limit myself to fuse contacts 11 of any one type but I have shown metallic screw threaded shells 12 adapted to receive screw plug fuses 13. These shells are connected in the usual manner with conducting links 14 the outer ends of which are provided with binding screws 15 and meter testing lugs 16. In the center of the sockets and insulated from the shells are screw terminals 17 designed to be engaged by the center terminals of the screw plug fuses. These terminals are connected with conducting links 18 the outer ends of which are provided with binding screws 19 and meter testing lugs 20. In the arrangement illustrated the center terminals for the plug fuses are designed to be connected with the leads 21 to the load side of the meter, while the screw shells which receive the fuse plugs are designed to be connected with the terminals 22 of the load wires.

When the base is secured in position in the box these fuses, which are on the load side of the meter, stand back of the opening through the cover so that they may be reached when the lid on the cover is open.

When the device is to be used for a three wire installation as shown, a neutral conductor or link 23 is provided. In order that the entire block and the enclosing box therefor may be as narrow as possible and particularly in order that the opening 3 may be as narrow as possible, I preferably locate the two pairs of fuse contacts 11, 11 as close together as is permitted by the predetermined electrical connections and by the mechanical construction of the fuses that are to be used. In order to make this close spacing possible, the neutral conductor 23, instead of being located on the front of the base as has been prior practice in fuse block construction, is located on the back of the base so as not to interfere in any way with the location of fuse contacts on the front thereof. With a two wire system, the neutral conductor may be omitted.

Mounted within the box, and preferably and ordinarily upon the unitary insulating base 6, is a means for receiving at least one fuse and preferably also a switch means. The last said fuse receiving means is connectible on the service side of the meter, that is, between the meter and the service wires and the said switch when used is connectible in series with both the load side and the service side fuse means and also with the meter. At least one of the last said means, that is, the service side fuse means and the switch means, is located on a face of the block other than the face upon which the load side fuse means is located. Preferably, both of these said means are located otherwise than on the said face of the base carrying the load side fuse means and preferably the said service side fuse means and the said switch means are located on different faces of the base. As shown, and in accordance with the preferred embodiment of the invention, the load side fuse means 24 is located on a face of the block such as 6$^b$ perpendicular to the front face 6$^a$ and the switch means 32 is located on the face of the block 6$^c$ opposite the front face 6$^a$.

As preferred and shown, the service side fuse means comprises two pairs of fuse contacts, so that two legs of the circuit may be fused, but it will be understood that I do not limit myself to two pairs of such contacts. I do not limit myself to fuse contacts of any one type but ordinarily the service side contacts will be of the same type as the load side fuse contacts.

In the construction as shown there are located on the upper edge face 6$^b$ of the base metallic screw threaded shells 25 for receiving screw plug fuses 26. These shells are electrically connected with conducting pieces 27 provided with binding screws 28 and testing lugs 29. In the center of the sockets and insulated from the shells are screw terminals 30 adapted to be engaged by the center terminals of the plug fuses.

In the back face of the base are recesses 31 in which switches 32 are located. The upper ends of the switching members are pivoted to conducting brackets 33 which are connected with and held in place by the fuse center screws 30 while the swinging ends of the switching members are adapted to be engaged with and be disengaged from the conducting brackets 34 that are secured in the recesses near the lower edge of the base and are provided with wire clamping means 35. Fastened to the switching members are plates 36 of insulation which have slots 37. Extending across the box back of the base and passing through the slots in the insulating plates fastened to the switching members is a switch operating crank rod 38 that has one end extended on the outside of the box to provide an operating handle 29. By turning this handle the switches may be opened and closed. The conducting pieces 27 at the top, and to which the fuse shells 25 are connected, are designed to be connected with the leads 40 to the service side of the meter while the brackets 34 at the bottom and with which the switching members engage are designed to be connected with the terminals 41 of the service wires.

It will be observed that testing lugs are associated with both the service side and load side fuse contacts, and it will be further observed that the testing lugs 16, 16 associated with the last said contacts are at the load side thereof, that is, at the side away from the meter. This makes it possible for by-pass connections to be used in accordance with ordinary meter testing practice to maintain the load circuit independently of the meter. Inasmuch as the lugs 16, 16 are on the load side of the load fuses 13, the meter can be entirely disconnected from the load circuit by removing the said load fuses. In this way, the load fuses serve as test switches, taking the place of the special test switches which are commonly provided.

When this simple, cheap and compact block having all of the required elements mounted on the single base, is secured in a box the load side fuses are in front where they can be readily reached if desired for removal or renewal, the service side fuses are at the top where they can be reached when the cover is open but cannot be reached when the cover is closed, and the switch is at the back where it cannot be reached unless the cover is open, but can be thrown at any time. Owing to the compactness of the block the box containing it may be made smaller than those previously provided for installations having the same protecting means and yet leave ample room within the box for manipulating the switch and fuses and making the necessary circuit and testing connections. When the cover is closed and sealed no live part on the service side of the meter can be reached or tampered with. The circuit controlling elements mounted on the single base may be varied, as conditions arise, but there always are, on the load side of the meter connections, fuses that are accessible when the box is installed and is sealed so as to protect the meter and prevent tampering with the connections. The block comprising the base and conducting elements is a unitary structure and the base may, as illustrated, be formed of one piece of insulation or may be formed of more than one piece without departing from the invention.

The invention claimed is:

1. In a fuse block, the combination of a unitary insulating base adapted to be mounted in fixed relation to a support, the said base having a plurality of faces adapted for mounting electrical parts and respectively facing in different directions substantially at right angles to each other and one of them facing outward away from the said support, a pair of fuse receiving contacts on the last said face of the base, another pair of fuse receiving contacts on another said face of the base, and means whereby the said pairs of fuse contacts may be electrically connected in series with each other with a meter between them so that the first said contacts are on the load side of the meter and the second said contacts are on the service side of the meter.

2. In a switch and fuse block, the combination of a unitary insulating base adapted to be mounted in fixed relation to a support, the said base having a plurality of faces respectively facing in different directions substantially at right angles to each other and one of them facing outward away from the said support, a pair of fuse receiving contacts on the last said face of the base, a manually operable switch on another said face of the base, and means whereby the said fuse contacts and switch may be electrically connected in series with each other with a meter between them so that the fuse contacts are on the load side of the meter and the switch is on the service side of the meter.

3. In a switch and fuse block, the combination of a unitary insulating base adapted to be mounted in fixed relation to a support, the said base having a plurality of faces adapted for mounting electrical parts and respectively facing in different directions substantially at right angles to each other and one of them facing outward away from the said support, a pair of fuse receiving contacts on the last said face of the base, another pair of fuse receiving contacts on one face of the base, a switch on a face of the base other than that on which the first said fuse contacts are mounted, and means whereby the said pairs of fuse contacts and the said switch may be electrically connected in series with each other with a meter between the said pairs of fuse contacts so that the first said contacts are on the load side of the meter and the second said contacts are on the service side of the meter.

4. In a switch and fuse block, the combination of a unitary insulating base adapted to be mounted in fixed relation to a support, the said base having a plurality of faces adapted for mounting electrical parts and respectively facing in different directions substantially at right angles to each other and one of them facing outward away from the said support, a pair of fuse receiving contacts on the last said face of the base, another pair of fuse receiving contacts on a face of the base other than that on which the first said fuse contacts are mounted, a switch on a face of the base other than that on which the first said fuse contacts are mounted, and means whereby the said pairs of fuse contacts and the said switch may be electrically connected in series with each other with a meter between the said pairs of fuse contacts so that the first said contacts are on the load side of the meter and the second said contacts on the service side of the meter.

5. In a switch and fuse block, the combination of a unitary insulating base adapted to be mounted in fixed relation to a support, the said base having a plurality of faces adapted for mounting electrical parts and respectively facing in different directions and one of them facing outward away from the said support, a pair of fuse receiving contacts on the last said face of the base, another pair of fuse receiving contacts on a face of the base substantially perpendicular to the face on which the first said fuse contacts are mounted, a switch on the face of the base opposite the face on which the first said fuse contacts are mounted, and means whereby the said pairs of fuse contacts and the said switch may be electrically connected in series with each other with a meter between the said pairs of fuse contacts so that the first said contacts are on the load side of the meter and the second said contacts on the service side of the meter.

6. The combination in a meter service appurtenance, of a box including an openable front cover having an opening therein, means whereby the cover may be sealed in closed position so as to entirely close the box except for the said cover opening, a unitary insulating base in the box positioned to close the said opening in the cover when the cover is in closed position, load side connectible fuse receiving contacts mounted on the base so as to be accessible through the said opening when the cover is in closed position, a switch mounted on the base within the box so as to be inaccessible when the cover is closed, means including a handle on the exterior of the box for operating the switch, and means whereby the said fuse contacts and switch may be electrically connected in series with each other with a meter between them so that the fuse contacts are on the load side of the meter and the switch is on the service side of the meter.

7. The combination in a meter service appurtenance, of a box including an openable front cover having an opening therein, means whereby the cover may be sealed in closed position so as to entirely close the box except for the said cover opening, a unitary insulating base in the box positioned to close the said opening in the cover when the cover is in closed position, load side connectible fuse receiving contacts mounted on the base so as to be accessible through the said opening when the cover is in closed position, service side connectible fuse receiving contacts mounted on the base within the box so as to be inaccessible when the cover is closed, a switch mounted on the base within the box so as to be inaccessible when the cover is closed, the said switch being connectible in series with the said fuse receiving contacts and with the meter, and means including a handle on the exterior of the box for operating the switch.

8. The combination in a meter service appurtenance, of a box including an openable front cover, the said cover of the box having an opening therein, means whereby the cover may be sealed in closed position, a unitary insulating base positioned in the box so as to close the said opening in the cover when the cover is closed, a fuse receiving means on the front face of the base electrically connectible between the meter and load wires and located to be accessible through the said cover opening from the exterior of the box with the cover in closed position, a fuse receiving means on the base within the box electrically connectible between service wires and the meter, a switch means on the base within the box electrically connectible in series with both of the said fuse receiving means and with the meter, both of the last said means being inaccessible when the cover is in closed position and the said switch means being on a portion of the base other than the said front face, and means including a handle on the exterior of the box for operating the said switch means.

9. The combination in a meter service appurtenance, of a box including an openable front cover having an opening therein, means whereby the cover may be sealed in closed position, a unitary insulating base in the box positioned to close the said opening in the cover when the cover is in closed position, load side connectible fuse receiving contacts mounted on the base so as to be accessible through the said opening when the cover is in closed position, service side connectible fuse receiving contacts mounted on the base within the box so as to be inaccessible when the cover is closed, a switch mounted on the base within the box so as to be inaccessible when the cover is closed, the said switch being connectible in series with the said fuse receiving contacts and with the meter, means including a handle on the exterior of the box for operating the switch, and inaccessible meter testing by-pass lugs associated respectively with the service side connections and with the load fuse contacts at the load side thereof so that with a by-pass in place a load fuse engaged by said contacts may serve upon removal as a means for disconnecting the meter from the load circuit during testing.

10. A protected switch and fuse device comprising in combination, a box including an openable front cover, one wall of the box having an opening therein, means whereby the cover may be sealed in closed position, a unitary insulating base in the box having a plurality of faces adapted for mounting electrical parts and respectively facing in different directions substantially at right angles to each other, the said base being positioned in the box so as to normally close the said opening in the box wall, a fuse receiving means on one face of the base electrically connectible between the meter and load wires and located to be accessible through the said opening from the exterior of the box with the cover in closed position, and other fuse receiving means on the base within the box electrically connectible between service wires and the meter, the said service side fuse receiving means being on a face of the base other than that upon which the load side fuse receiving means is located and being inaccessible when the cover is in closed position.

11. A protected switch and fuse device comprising in combination a box including an openable front cover, one wall of the box having an opening therein, means whereby the cover may be sealed in closed position, a unitary insulating base in the box having a plurality of faces adapted for mounting electrical parts and respectively facing in different directions substantially at right angles to each other, the said base being positioned in the box so as to normally close the said opening in the box wall, a fuse receiving means on one face of the base electrically connectible between the meter and load wires and located to be accessible through the said opening from the exterior of the box with the cover in closed position, a fuse receiving means on the base within the box electrically connectible between service wires and the meter, a switch means on the base within the box electrically connectible in series with both of the said fuse receiving means and with the meter, at least one of the last two said means being on a face of the base other than that upon which the load side fuse receiving means is located and both of the said means being inaccessible when the cover is in closed position, and means including a handle on the exterior of the box for operating the said switch means.

12. A protected switch and fuse device comprising in combination a box including an openable front cover, one wall of the box having an opening therein, means whereby the cover may be sealed in closed position, a unitary insulating base in the box having a plurality of faces adapted for mounting electrical parts and respectively facing in different directions substantially at right angles to each other, the said base being positioned in the box so as to normally close the said opening in the box wall, a fuse receiving means on one face of the base electrically connectible between the meter and load wires and located to be accessible through the said opening from the exterior of the box with the cover in closed position, a service side fuse receiving means on the base within the box electrically connectible between service wires and the meter, a switch means on the base within the box electrically connectible in series with both of the said fuse receiving means and with the meter, the two last said means being mounted respectively on two different faces of the base and both of the said means being inaccessible when the cover is in closed position, and means including a handle on the exterior of the box for operating the said switch means.

13. A protected switch and fuse device comprising in combination a box including an openable front cover, one wall of the box having an opening therein, means whereby the cover may be sealed in closed position, a unitary insulating base in the box having a plurality of faces adapted for mounting electrical parts and respectively facing in different directions substantially at right angles to each other, the said base being positioned in the box so as to normally close the said opening in the box wall, a fuse receiving means on one face of the base electrically connectible between the meter and load wires and located to be accessible through the said opening from the exterior of the box with the cover in closed position, a fuse receiving means on an end face of the base within the box electrically connectible between service wires and the meter and inaccessible when the cover is in closed position, a switch means on the back face of the base within the box electrically connectible in series with both of the said fuse receiving means and with the meter and inaccessible when the cover is in closed position, and means including a handle on the exterior of the box for operating the said switch means.

14. The combination in a meter service appurtenance, of a box including an openable front cover having an opening therein, means whereby the cover may be sealed in closed position, a unitary insulating base in the box having a plurality of faces adapted for mounting electrical parts and respectively facing in different directions substantially at right angles to each other, the said base being positioned in the box so as to close the said opening in the cover when the cover is closed, two closely spaced pairs of fuse receiving contacts on the front face of the base electrically connectible between the meter and load wires and located to be accessible through the said cover opening from the exterior of the box with the cover in closed position, two other pairs of fuse receiving contacts on one end face of the base electrically connectible between service wires and the meter, two switches on the back face of the base electrically connectible in series respectively with the aforesaid load side and service side fuse contacts, the said pairs of load side fuse contacts, the said pairs of service side fuse contacts and the said switches all being symmetrically located with respect to a common center line, and means including a handle on the exterior of the box for operating the said switches.

15. In a switch and fuse block, the combination of a unitary insulating base adapted to be mounted in fixed relation to a support and having a plurality of faces adapted for mounting electrical parts and respectively facing in different directions and one of them facing outward away from the said support, two pairs of fuse receiving contacts on the last said face of the base, the said pairs of contacts being arranged with the spacing between them approximating the minimum spacing made necessary by the predetermined electrical conditions and by the mechanical construction of the fuses to be used and the said pairs of contacts being connectible between a meter and load wires, two other pairs of fuse receiving contacts on the base connectible between service wires and the meter, two switches on the base connectible in series respectively with the aforesaid load side and service side fuse contacts and with the meter, the said service side connectible fuse contacts and the switches being each mounted on a face of the base other than the front face, and a neutral conductor extending across the face of the base opposite the face on which the said load side connectible fuse contacts are mounted.

16. In a switch and fuse block, the combination of a unitary insulating base adapted to be mounted in fixed relation to a support and having a plurality of faces adapted for mounting electrical parts and respectively facing in different directions and one of them facing outward away from the said support, two pairs of fuse receiving contacts on the last said face of the base, the said pairs of contacts being arranged with the spacing between them approximating the minimum spacing made necessary by the predetermined electrical conditions and by the mechanical construction of the fuses to be used and the said pairs of contacts being connectible between a meter and load wires, two other pairs of fuse receiving contacts on a face of the base substantially perpendicular to the face on which the first said fuse contacts are mounted, the last said pairs of contacts being connectible between service wires and the meter, two switches on the face of the base opposite the face on which the first said fuse contacts are mounted, the said switches being connectible in series respectively with the aforesaid load side and service side fuse contacts and with the meter, and a neutral conductor extending across the last said face of the base parallelly with the said switches.

JOSEPH SACHS.